United States Patent [19]
Earle et al.

[11] 3,882,598
[45] May 13, 1975

[54] DUST CONTROL CUTTING ASSEMBLY FOR CUTTING SHEET MATERIAL

[75] Inventors: Paul Lewis Earle, Denver; Timothy Howard Seeber, Evergreen; Milton French Trosper, Jr., Thornton, all of Colo.

[73] Assignee: Johns-Manville Corporation, Denver, Colo.

[22] Filed: June 17, 1974

[21] Appl. No.: 479,956

[52] U.S. Cl. .............. 30/390; 51/273; 144/252 R; 269/21
[51] Int. Cl. .................. B27b 9/00; B27g 19/04
[58] Field of Search ............ 30/124, 133, 388, 390, 30/391; 144/252 R; 83/177; 269/15, 21; 51/273

[56] References Cited
UNITED STATES PATENTS

| | | | |
|---|---|---|---|
| 1,876,337 | 9/1932 | Mead | 30/133 X |
| 3,119,602 | 1/1964 | Johnson | 51/273 X |
| 3,123,111 | 3/1964 | Mattson | 144/252 R |
| 3,322,169 | 5/1967 | Hilliard | 144/252 R |
| 3,339,597 | 9/1967 | Kohler | 144/252 R |
| 3,721,141 | 3/1973 | Frostad | 30/391 |

*Primary Examiner*—Al Lawrence Smith
*Assistant Examiner*—J. C. Peters
*Attorney, Agent, or Firm*—Robert M. Krone; Stephen C. Shear

[57] ABSTRACT

An assembly for cutting sheet material is disclosed herein and includes a conventional circular saw which has been modified to provide a reliable dust pick up arrangement for collecting the sawdust produced during the operation of the saw and preventing this sawdust from escaping into the ambient surroundings. This arrangement includes a main dust pick up and a secondary dust pick up which are strategically located relative to the blade of the saw to capture and collect the dust at the saw's front end as the saw blade cuts through the sheet material. The cutting assembly also includes means to prevent dust at the back end of the saw from escaping to the ambient surroundings and, when a hollow open-ended sheet is being cut, means for capturing and collecting dust produced at the interior of the sheet.

11 Claims, 11 Drawing Figures

PATENTED MAY 13 1975
3,882,598
SHEET 1 OF 2
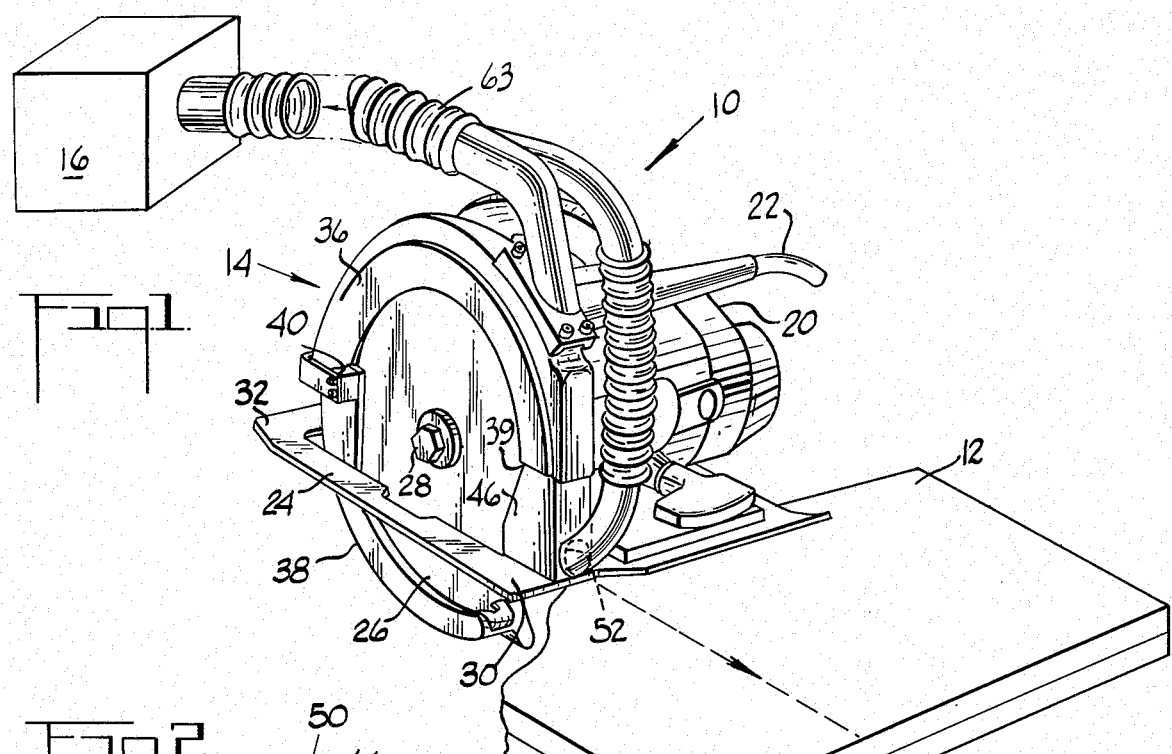
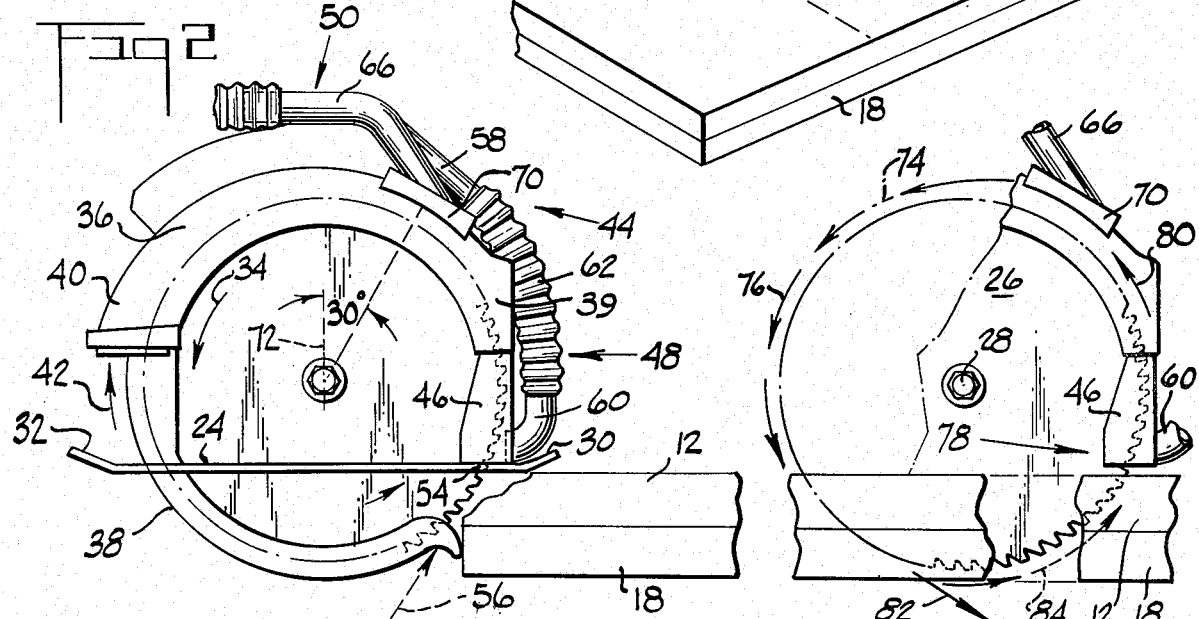
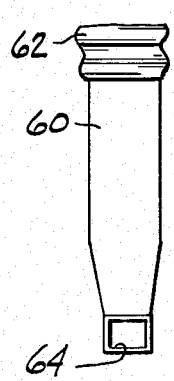
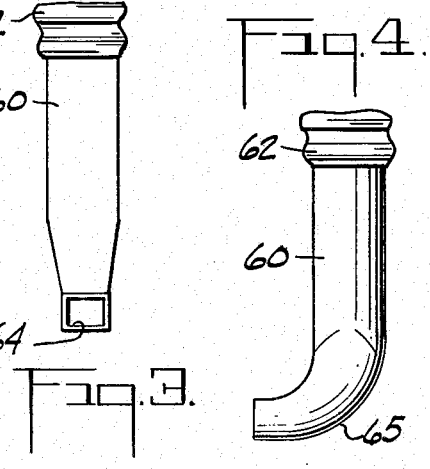
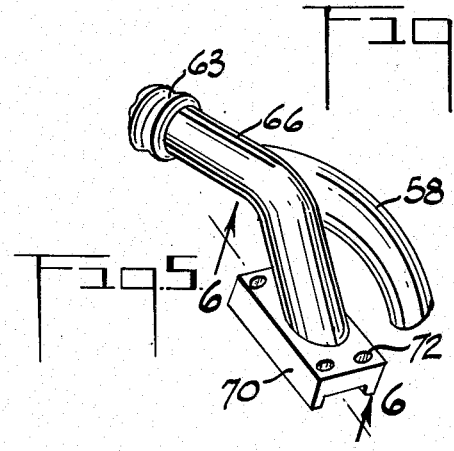

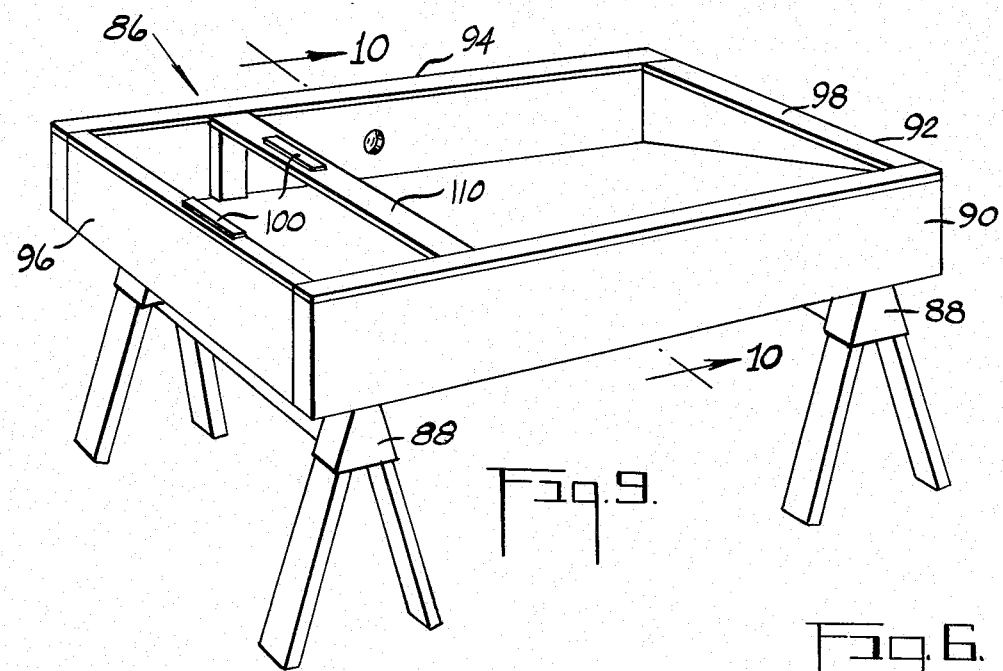
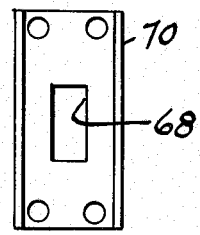
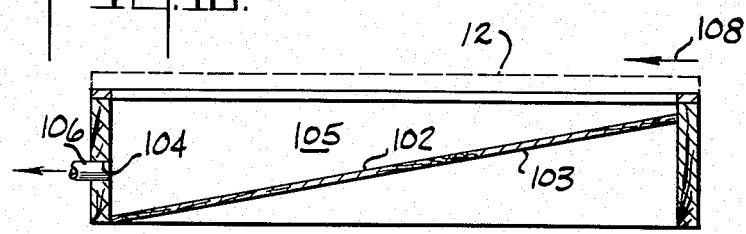
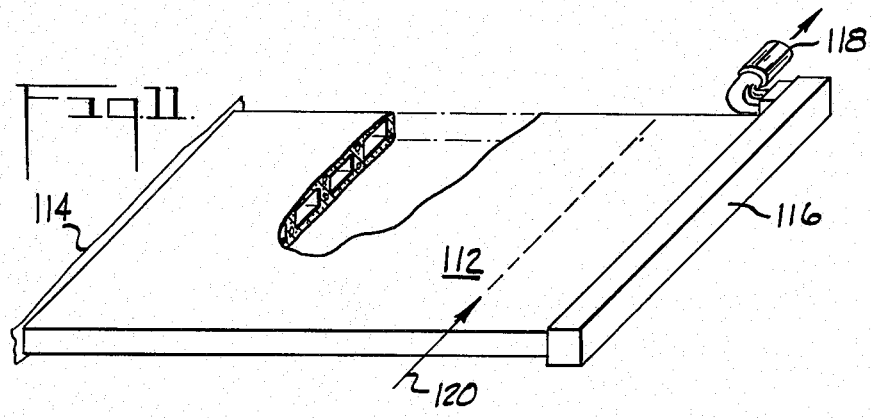
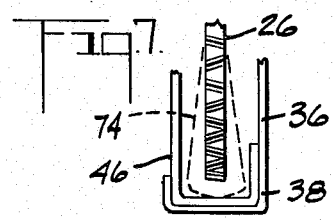

DUST CONTROL CUTTING ASSEMBLY FOR CUTTING SHEET MATERIAL

BACKGROUND OF THE INVENTION

1. Field Of The Invention

The present invention relates generally to assemblies for cutting sheet material and more particularly to a cutting assembly which minimizes the amount of dust escaping to ambient surroundings during operation of the assembly.

2. Description of the Prior Art

Hand powered tools are used extensively in industry to apply the finishing touches to sheet material initially manufactured in roughened form. One such tool is, of course, a saw and specifically a circular saw which is used to cut the sheet material to meet specifications. This particular tool, as is well known, produces a large amount of dust during cutting operation, especially where the sheet material being cut is of low density or relatively low density. The production of dust escaping to the ambient surroundings is objectionable for various reasons. First, it tends to collect around and in adjoining machinery (if any), possibly causing damage to this machinery and, in any event, producing an unclean surroundings requiring constant cleanup care. Second, the escaping dust, especially light, powdery dust produced from cutting low density boards, tends to permeate the air and may possibly be inhaled by operators in the vicinity. This by itself may be objectionable and any steps to minimize and preferably eliminate this possible situation is desirable.

One common suggestion to eliminate the ambient dust problem resulting from circular saw operations has been to encapsulate the saw with a protective housing which is designed to contain and, by means of suction, collect most or all of the produced dust. However, to meet this objective, Applicants have found such a housing to be very expensive and very bulky and making, what should be a simple cutting operation, a rather complex operation. As will be seen hereinafter, the present invention provides for the same objectives, i.e., eliminating ambient dust resulting from the operation of a circular saw, however, in a reliable and yet uncomplicated and economical manner.

BRIEF SUMMARY OF THE INVENTION

An object of the invention is to provide a reliable, uncomplicated and economical assembly for cutting sheet material, which assembly minimizes the amount of dust escaping to the ambient surroundings during and as a result of assembly operation.

Another object of the present invention is to provide a reliable, uncomplicated and economical improvement to a circular saw comprising part of the cutting assembly, which improvement goes a long way to minimize the amount of dust escaping to the ambient surroundings during operation of the saw.

As will be described in detail hereinafter, an overall assembly for cutting sheet material has been designed in accordance with the present invention to meet the above recited objects. This assembly, which includes a circular saw for providing the cutting operation, has been specifically designed to capture and collect most, if not substantially all, of the dust produced at all of the points around the saw during operation of the latter. As will be seen hereinafter, this has been done in a reliable and yet uncomplicated and economical fashion.

One conventional type of circular saw used in industry today includes a horizontally extending flat base under and against which the sheet material to be cut passes, a circular saw blade supported partially above and partially below the base in, for example, a vertical plane and means for rotating the blade in a direction which causes the outer edge of blade to rotate up at the front end of the base and down at the back end of the base. This type of saw also typically includes a top blade guard fixedly located around a top outer edge portion of the blade, the guard having a front end vertically spaced above the front end of the base, and a bottom blade guard located around a bottom outer edge portion of the blade, the bottom guard being movable towards and around the back end of the base.

In accordance with one feature of the present invention, the above described typical or conventional circular saw has been improved upon, at least from the standpoint of dust collection, to include two and preferably three specific features. First, the saw has been modified to include a vertically extending shroud of substantially U-shaped cross section, the shroud being positioned around an outer edge portion of the saw blade between the front end of the top blade guard and the front end of the base. This shroud has one end substantially vacuum seal connected with the front end of the top blade guard and its opposite end firmly connected with the front end of the base.

In addition to this shroud, the saw has been modified to include a main suction conveyance tube having one open end adapted for connection with suction producing means and the other open end vacuum seal connected with the shroud around an opening through the latter. This open end connected to the shroud defines a main suction tube opening preferably located in the plane of and, in any case, in front of the saw blade adjacent the blade and the base to capture and collect dust emitted out the front end of the saw during operation of the latter. For best results, the suction tube opening is approximately located on a specific line, which line is tangent to the outer edge of the blade, passing through the forward most intersection of the blade and the base.

The circular saw may also include and preferably includes a secondary suction conveyance tube having an open end adapted for connection with suction producing means and the other open end vacuum seal connected with the top blade guard around an opening extending therethrough. This latter open end defines a secondary suction tube opening preferably located in the plane of the saw blade and, in any case, adjacent the top blade guard and forwardly of a vertical plane, which plane is normal to the saw blade, passing through the center of the latter, i.e., a vertical bisecting plane. This secondary suction tube is provided for capturing and collecting dust which is not captured and collected by the main suction conveyance tube. In this regard, for best results, the secondary suction tube opening is preferably located at a point approximately 30° in front of the vertical bisecting plane just discussed As will be described in more detail hereinafter, the above discussed shroud, main suction conveyance tube and secondary suction conveyance tube have been provided to capture and collect dust directed upwardly in front of the saw during operation of the latter. However, there is also dust produced at the back end of the saw, which dust is generally directed downwardly away from the base of the saw towards the front end thereof. In accordance with another feature of the present invention, the overall cutting assembly includes a support arrangement for preventing this downwardly directed dust from escaping into the ambient surroundings.

In one embodiment, this last mentioned arrangement comprises a sheet of material, i.e., a support board, constructed of a material, for example, plywood, which can be readily cut by the circular saw without damaging the saw blade. The support board is positioned directly under and supports the sheet material to be cut and is sufficiently thick so that the blade of the saw does not cut entirely through it during the cutting operation. In this way, the support board directs the dust produced at the back end of the saw through the partial cut therein up and into the cut in the top board and thereafter into the U-shaped shroud where the dust is eventually collected by he main and secondary suction conveyance tubes.

Utilization of the above described support board has been found to be quite suitable in minimizing the back end dust problem during operation of the circular saw where the board being cut is of relatively high density, for example, around 100 lbs. per cubic foot or more. However, Applicants have found that where lesser dense sheet material is being cut, better results are obtained with respect to the back end dust problem by utilizing a vacuum support table constructed in accordance with the present invention, in place of the support board. This table includes a horizontally extending circumferential top edge to support the sheet material to be cut and means for vacuum sealing the sheet material to this edge. The table also includes sidewall means and a flat bottom surface tapering down from one segment of the top edge to the sidewall means directly below an opposite end segment of the top edge. The top edge, sidewall means and bottom surface and the sheet material to be cut together define a vacuum sealed compartment which captures the dust produced at the back end of the saw. This capture dust is drawn out of the compartment by means of suction located at a specific point in the compartment.

Where the sheet material being cut is hollow and opened at opposite ends, a dust problem may develop within the sheet causing dust to be directed out the open ends, especially where the hollow sheet is of a low density material. In accordance with still another feature of the present invention, the cutting assembly includes first and second means for sealing the opposite open ends of the sheet material and means for drawing out any air and dust within the sheet material through one of the sealing means, the air and dust being drawn out at a corner of the sheet material.

BRIEF DESCRIPTION OF THE DRAWINGS

FIG. 1 is a perspective view, partially broken away, of an assembly for cutting sheet material, constructed in accordance with one embodiment of the present invention and particularly illustrating an improved circular saw which comprises part of the assembly and which itself is constructed in accordance with the present invention.

FIG. 2 is a side elevational view of the saw of FIG. 1 along with the sheet material to be cut and a support board directly under the sheet material.

FIGS. 3 and 4 illustrate two views of a main dust pickup head comprising part of the saw of FIG. 1.

FIGS. 5 and 6 illustrate two views of a secondary dust pickup head comprising part of the saw of FIG. 1.

FIG. 7 is a schematic illustration of a portion of the saw of FIG. 1, particularly illustrating an operational feature of the saw.

FIG. 8 is a schematic illustration of a portion of the saw of FIG. 1, particularly illustrating an operational feature of the saw.

FIG. 9 is a perspective view of a support table which comprises part of a cutting assembly constructed in accordance with another embodiment of the present invention and which is provided for supporting the sheet material to be cut by the saw illustrated in FIG. 1.

FIG. 10 is a cross sectional view of the table of FIG. 9, taken generally along line 10—10 in FIG. 9.

FIG. 11 is a perspective view of an open ended hollow sheet to be cut crosswise by the saw of FIG. 1 and particularly illustrating another feature of the cutting assembly of the present invention.

DETAILED DESCRIPTION AND PREFERRED EMBODIMENTS

Turning now to the drawings, wherein like components are designated by like reference numerals throughout the various figures, attention is first directed to FIGS. 1-8, which together illustrate various components comprising an assembly 10 for cutting sheet material 12. As will be described in more detail hereinafter, assembly 10 includes a power driven circular saw 14 constructed in accordance with the present invention, conventional suction producing means 16 and a board 18 which is provided to support sheet 12 during the cutting operation. Sheet 12 may be constructed of any suitable material which can be readily cut by means of a circular saw such as, for example, wood, fiberboard, gypsum board or the like. Obviously, sheet 12 would generally be of a material which requires the utilization of a power tool such as a circular saw in cutting the sheet and, in any event, would most likely be a material which, when cut by a circular saw of the type to be described, would throw off sawdust produced as a result of and during the cutting operation.

Circular saw 14 is one which includes many inventional components and yet one which has been substantially improved upon, from the standpoint of dust collection, that is, from the standpoint of minimizing the accumulation of dust in the ambient surroundings as a result of and during cutting of sheet 12 by the saw. In this regard, attention is firstly directed to the conventional components making up saw 14. These conventional components include a housing 20 (FIG. 1) within which is located a drive motor (not shown), for example, one which is actuated electrically, an electrical cord 22 to connect the motor to a power source, and one or more control and/or positioning switches (not shown).

Circular saw 14 also conventionally includes a horizontally extending flat base 24 upon which housing 20 and the motor therein are supported and under and against which sheet 12 moves during the cutting operation. In addition, saw 14 includes a circular saw blade 26 which is supported by suitable means including the indicated nut and washer generally designated at 28, the saw blade being located partially above and partially below base 24 in a predetermined vertical plane. The blade is interlocked with the motor and housing 20 to rotate in a counterclockwise direction as viewed in FIG. 2, that is, in a direction which causes the outer edge of the blade to rotate up at the front end 30 of the base and down at the back end 32 of the base, as indicated by arrow 34 in FIG. 2.

In addition to the conventional features just discussed, circular saw 14 includes as typical features a top blade guard 36 and a bottom blade guard 38. The top blade guard, which is curvilinear in length and substantially U-shaped in cross section, is fixably connected by means not shown with housing 20 and is located around a top outer edged portion of blade 26, as best seen in FIG. 2. The front end 39 of this blade guard is vertically spaced directly above the front end 30 of base 24 and its back end 40 is vertically spaced directly above back end 32 of the base. The bottom blade guard 38, which is also curvilinear in length and substantially U-shaped in cross section, is located around a bottom outer edge portion of the saw blade and, by suitable means not shown, is movable towards and around the back end of the base along the bottom and side outer edges of the saw blade in the direction of arrow 42. In this regard, as is well known, bottom blade guard 38 moves up and into top blade guard 40 as saw 14 saws through sheet 12.

The above recited features of saw 14, as stated, are conventional and well known in the art. As a result, they have not been described in detail but rather have only been discussed to a degree surficient to aid in describing one aspect of the present invention which is a particular improvement to the overall saw. In this regard, saw 14 may include other conventional features not shown and/or not described herein and those described may vary to some degree from saw to saw. In any event, those features just discussed and those not discussed are readily within the knowledge of those skilled in the art. In this regard, as will be stated below, saw 14 may be one which provides for vertical adjustment of the saw blade relative to base 24. However, for purposes of describing the saw, it will be assumed that the blade is in the vertical position shown and described with respect to FIGS. 1 and 2.

In accordance with the present invention circular saw 14 including an arrangement 44 which is provided for capturing and collecting, by means of suction, sawdust which is produced or otherwise located at the front end of the saw during cutting of sheet 12. This arrangement, which provides not only a reliable way in which the dust is captured and collected but also an uncomplicated and economical way of doing this, includes a shroud 46, a main suction conveyance tube 48 and a secondary suction conveyance tube 50. As will be described in more detail hereinafter, shroud 46 acts as a collecting chamber for collecting the sawdust produced at the front end of the saw and, in fact, sawdust which is produced at the back end of the saw but which is directed towards the front end thereof. The sawdust collected in this chamber, by means of suction producing means 16, is caused to move through main suction conveyance tube 48 and into a storage chamber (not shown). Any dust going into shroud 46 and not removed through tube 48 will move up and out of shroud 46 where, again by means of suction producing means 16, it is driven through secondary suction conveyance tube 50 to the storage chamber.

Shroud 46, which extends vertically from the front end 39 of top blade guard 36 to the front end 30 of base 24, is substantially U-shaped in cross section, as indicated best in FIG. 7. The shroud is positioned around an outer edge portion of saw blade 26 between the front end of the top blade guard and base, as indicated best in FIG. 2, and has its top end substantially vacuum seal connected with the front end of the top blade guard and its bottom end substantially vacuum seal connected with the front end of the base. In this regard, the vacuum seal connections between the shroud and the top blade guard at one end and the base at the other end can be provided in any suitable manner. For example, these seals can be provided by providing tight mechanical fits between the components, they can be provided by the utilization of a separate seal or they can be provided by integrally forming the shroud with the top blade guard and with the base. For reasons to be described below, shroud 46 includes an opening 52 (see FIG. 1) which extends therethrough and which is located preferably in the plane of and, in any case, in front of the saw blade 26 adjacent the front end of the base and adjacent the outer edge of the blade. This opening is perferably approximately located on a line which is tangent to the outer edge of the blade and which passes through the forward most intersection 54 of the blade and the base, the tangent line being generally designated by the arrow 56.

Main suction conveyance tube 48 includes a rigid back tubular section 58, a rigid front tubular section or dust pickup head 60 and a longitudinally variable, intermediate, bellow type tubular section 62 joining the vacuum pickup head 60 with back section 58. The otherwise open end of rigid back section 58 is connected to a common, longitudinally variable, bellow type tubular section 63 which, in turn, is suitably connected to suction producing means 16 to provide suction through tube 48 in the direction of supply means 16. The otherwise free end of vacuum pickup head 60 is vacuum seal connected, again by any suitable means, around opening 52 in shroud 46. In this regard, the size and shape of the opening at the free end of vacuum pickup head 60, which opening is generally designated by the reference 64, is preferably identical to that of opening 52. Hence, the two openings define a single suction tube opening located in the position described with respect to opening 52. It should, of course, be apparent that either one of these openings 52 or 64 could, by itself, define the main suction tube opening of conveyance tube 48. For example, if opening 52 were smaller than opening 64, the former would, in effect, define the suction tube opening. On the other hand, if the end of head 60 were actually inserted into opening 52 of the shroud, opening 64, by itself, would define the suction tube opening. For purposes of the present invention, while any of these alternatives could be utilized, for purposes of simplicity it will be assumed that the opening 64 defines the suction tube opening and, hence, the suction tube opening will be referred to by the reference numeral 64.

In any case, the suction tube opening is preferably located in the plane of blade 26 and must be in front of the blade and adjacent to the blade and the base. In addition, as stated above, this opening is preferably located on tangent line 56. While the suction tube opening could be located slightly to one side of the blade without adversely affecting operation of dust pickup arrangement 44 to a great degree, it has been found that by positioning the opening to one side an undesirable siren affect is produced.

As illustrated best in FIG. 4, pickup head 60 and particularly the end 65 of pickup head 60 adjacent opening 64 is preferably curvilinear in shape, in fact, curving out and up from opening 64 when the latter is connected with shroud 46. It has been found that by providing this particular shape, the sawdust entering opening 64 can more smoothly travel up the suction conveyance tube with less turbulence than would be the case if the pickup head abruptly changed directions. This, in turn, allows for the production of greater suction at the suction tube opening for a given vacuum supply pressure and a given suction tube opening.

Secondary suction conveyance tube 50 comprises a front section or a secondary dust pickup head 66 which has its back open end also connected to common bellow section 63, as best seen in FIG. 1. The opened front end 68 (see FIG. 6) of pickup head 66 is vacuum seal connected with a top surface of top blade guard 36 around an opening (not shown) through the top blade guard. While this may be accomplished in any suitable manner, as shown best in FIGS. 5 and 6, the secondary suction conveyance tube includes a somewhat U-shaped mounting plate 70 which, as seen in FIGS. 1 and 2, fits over and around the top of blade guard 36 and which is fastened thereto by means of screws 72. Like opening 52 in shroud 46 and opening 64 at the front end of pickup head 60, opening 68 in pickup head 66 and the adjacent opening in top blade guard 36 are preferably identical in size and shape. However, also like the first two described openings, the opening in the top blade guard could be smaller than opening 68 or opening 68 could be located internally of the opening of the top blade guard. For purposes of description, it will be assumed that these two latter openings are identical.

For reasons to become apparent hereinafter, opening 68, which defines a secondary suction tube opening, is located adjacent the outer edge of saw blade 26 (actually at the top blade guard) forwardly of a vertical plane which is normal to the plane of the saw blade and which passes through the center of the latter, i.e., a vertical bisecting plane generally indicated at 72 in FIG. 2. The secondary suction tube opening is preferably also located in the plane of saw blade 26 but may be slightly to one side thereof. However, positioning the opening slightly to one side of the blade has been found to produce the aforementioned objectionable siren affect. Further, it has been found that secondary suction tube opening 68 is most preferably located at an angle of approximately 30° in front of vertical bisecting plane 72, as indicated in FIG. 2. There are two main reasons for this preferred position, i.e., 30° in front of the vertical bisecting plane. First, it most often assures that the bottom of blade guard 38 will not block opening 68 when the bottom blade guard moves up and around the back of blade 26 and into top blade guard 36. Second, as will be seen below, it is far enough away from main suction tube opening 64 so as to capture and collect most of the dust coming up and around the saw which is not captured by the main suction conveyance tube.

Having described circular saw 10 including dust collecting arrangement 44, attention is now directed to the manner in which the saw operates. In this regard, it should be noted that saw blade 26 was described rotating in the counterclockwise direction, as viewed in FIG. 2, that is, up at the front end 30 of base 24 and down at the back end 32 of the base. This is a necessary requirement. The present invention is not applicable to those circular saws having blades which rotate in the opposite direction.

As seen best in FIGS. 7 and 8, as blade 26 rotates, an envelope of air, generally designated at 74, is developed around the entire outer periphery of the saw blade, moving in the same direction as the blade, as indicated by arrow 76. As illustrated in FIG. 7, this envelope of air tapers outwardly away from both sides of the blade from the center to the outer edge, thereby defining a "teardrop" pattern in cross section. The velocity of this envelope of air is, of course, dependent upon the speed of the saw blade. In any event, as the blade saws through sheet 12, producing dust, this envelope of air carries the dust with it.

As illustrated schematically in FIG. 8, as the front end of the saw blade cuts through sheet 12, the dust created at this front end is carried by envelope 74 in an upward direction initially along or approximately along tangential line 56. For main suction conveyance tube 48 to capture and collect this dust, the suction velocity at main suction tube opening 64 must be sufficiently high to deform that portion of the teardrop envelope within shroud 46, causing that portion of the envelope and the dust from the front end of the saw collected in the shroud to enter the opening, the dust thereafter being conveyed up through the main suction conveyance tube. In addition, the velocity at this opening should be sufficiently high so as to force air from the center of the rotating blade radially towards and into the shroud, as indicated by arrow 78. This prevents dust from escaping out the sides of the shroud otherwise due, for example, to turbulence created by the rotating nut 28.

While most of the dust entering into shroud 46 at its lower end will be collected at main suction tube opening 64, some may well escape at the top of the shroud, as indicated by arrow 80. Most of this escaped dust is, however, captured by secondary suction tube opening 68 and conveyed up secondary suction conveyance tube 50. In this regard, the suction velocity at the secondary suction tube opening must also be sufficiently high to deform the teardrop envelope at that point so as to force the dust carried by it into the opening.

As just stated, the deformation of envelope 74 to capture and collect the dust directed out the front end of blade 26 is dependent up sufficient suction velocity at the openings 64 and 68. The suction velocity at each of these two points will depend primarily on three factors, i.e., the available suction supply pressure at supply 16, the inner diameter of each of these suction conveyance tubes and the size of each suction tube opening. Obviously, the greater the available suction pressure at supply 16, everything else remaining the same, the greater the velocity would be at the suction tube openings. However, it can be quite expensive to supply high suction pressure and, hence, the available suction pressure supply 16 is preferably minimized.

In an actual working embodiment of saw 10, considering that the available supply suction pressure is minimized, for example, approximately between 3 and 3½ inches mercury, the suction conveyance tubes and suction conveyance openings have been designed and should be designed to provide, at the suction tube openings while opened, a suction pressure between approximately 2½ and 3 inches of mercury. Moreover, the suction tube openings are preferrably square in configuration, and in the working embodiment, each side of the square is between approximately ⅝ and 6/8th inch. The inner diameter of each suction conveyance tube is approximately ¾ to velocity inch in the working embodiment. This opening configuration not only provides sufficient suction velocity at each suction tube opening to deform air envelope 74 in the manner described above but has been found to provide the maximum suction velocity to deform the envelopes at the available suction supply pressure and given tube diameter. In any event, the suction velocoty at the openings should be at least approximately equal to the velocity of the air envelope and hence the velocity of the rotating blade.

Saw 14 has been described with blade 26 in a fixed position relative to base 24, i.e., with no vertical adjustment. If this is the case, the top and the bottom ends of shroud 46 could and preferably would be fixedly connected with the front ends of top guard 36 and base 24, respectively. However, saw 14 could be a type which conventionally includes vertical adjustment, i.e., the blade and base being vertically movable relative to one another by conventional means (not shown) to adjust the depth of the saw cut. Obviously, a charge in relative position between blade 26 and base 24 (and more than likely top guard 36 and shroud 46) will change the relative positions between the saw blade and suction tube openings 64 and 68 from that described above. So long as this change is only slight, the overall operation of arrangement 44 will not be substantially impaired. In any event, the suction tube openings 64 and 68 should be located in the positions discussed ablve, relative to the outer components of the saw, when blade 26 and base 24 are positioned in the manner shown, for example, with the lowest point on the blade being between approximately ½ and 2 inches directly below the base. In addition, if the saw is of the vertically adjustable type, the shroud would more than likely not be fixedly connected to both the top blades guard and base (unless it is itself vertically adjustable) but rather would be, for example, slidably connected with one or the other.

As stated previously, arrangement 44 including main suction conveyance tube 48 and secondary suction conveyance tube 50 is provided for capturing and collecting dust directed up the front end of saw blade 26 during the cutting operation. Note, however, in FIG. 8 that as the saw blade cuts through sheet 12, dust is produced at the back end of the saw blade and thrown downwardly in the direction generally indicated by arrow 82. To prevent this dust from escaping into the ambient surroundings, cutting assembly 10 includes support board 18. This support board is of a material which can be readily cut by the saw blade without damaging the latter, as stated above, and is located directly below sheet 12, i.e., the sheet being cut. As best illustrated in FIG. 8, as blade 26 saws through sheet 12, it also saws through a portion of the support board. In this regard, the support board must be sufficiently thick so that the saw blades does not saw entirely therethrough. In this manner, the dust produced at the back end of the blade, rather than being thrown out into the ambient surroundings in the direction of arrow 82, is directed through the cut in the support board and through the cut in sheet 12 up towards shroud 46, as indicated by dotted arrows 84, where the dust is collected by arrangement 44 in the same manner as the dust produced at the front end of the saw blade.

In certain cases, it is not desirable to redirect the dust produced at the back end of saw blade 26 up towards shroud 46. This is particularly true where the sheet being cut, i.e., sheet 12, is of low density, for example, less than approximately 75 lbs. per cubic foot. In this case, it is preferable to replace the support board with an independent arrangement for capturing and collecting the dust produced at the back end of the saw blade. One such arrangement and one which is preferred is illustrated in FIGS. 9 and 10, this arrangement being generally designated by the reference numeral 86.

As best illustrated in FIG. 9, arrangement 86 resembles a table which may be supported on suitable means such as, for example, sawhorses 88 or it may be free standing. This "table" which is rectangular in shape, includes vertically extending sidewalls 90, 92, 94 and 96 defining the outer periphery and a horizontally extending circumferential top edge 98 which, in lieu of support board 18, is provided for supporting sheet 12, as best seen in FIG. 10. In this regard, for reasons to become apparent hereinafter, sheet 12 must be vacuum sealed against top edge 98 during operation of cutting assembly 10 when arrangement 86 is utilized. To accomplish this, a suitable seal 100, for example, closed cell pressure sensitive tape approximately ¾ inche wide by ¼ inch thick, or any other suitable material, is provided around the entire top edge between this edge and sheet 12 when the latter is positioned thereon.

As best illustrated in FIG. 10, table 86 includes a surface 102 of a board 103 which extends entirely across the table from all four sidewalls. This surface tapers downwardly at an angle from the top edge of sidewall 90 to the bottom of sidewall 94. In this regard, the sidewall 90, other than for support, is not necessary and, in fact, the portions of sidewalls 92 and 96 located below surface 102 are not necessary, but are rather provided, first, for allowing the table to be easily supported and, second, to allow the table to be easily assembled.

Table 86 also includes an opening 104 which extends through sidewalls 94, i.e., above the lowest point of surface 102. The otherwise free end of a suction conveyance tube 106 (only partially shown) is vacuum seal connected around opening 104. The outer end of this suction conveyance tube is connected to suitable suction producing means (not shown) such as supply 16 or other suitable means.

In operation, sheet 12 is positioned on top edge 98, actually on seal 100 so that the sheet, the interior surfaces of sidewalls 90 to 96 and surface 102 define a vacuum seal compartment 105, the only access into which is opening 104. Sheet 12 is sawed in the direction of arrow 108, i.e., towards opening 104 from the opposite end. As the cutting operation commences, dust produced at the back end of saw 14 is directed into the chamber along arrow 82 (see FIG. 8). This dust is captured within the chamber and, by means of suction, driven out through opening 104 and into and through suction conveyance tube 106 where it is collected in suitable storage means.

Two points regarding table 86 should be noted. First, where the sheet being cut is flexible, it is possible for the suction within chamber 105 to cause the sheet to buckle inwardly uunless this is prevented. Hence, arrangement 86 may include one or more supports 110 extending across the table from one end of the opposite end at top edge 98. If these supports are provided, they would also include seals 100. Second, it should be noted that as saw blade 26 cuts through board 12, it is quite possible and, more than likely, that it would also cut partially through top edge 98. Hence, it is preferable that this top edge comprise part of separate board sections, as illustrated in FIGS. 9 and 10. In this manner, these board sections can be easily replaced without having to provide a completely new table.

As stated above, cutting assembly 10 including saw 14 as well as support board 18 or table arrangement 86 can be utilized to cut most types of sheet material. However, where the sheet material being cut is of the type illustrated in FIG. 11, that is, of the type which is hollow and which is opened at opposite longitudinal ends, it has been found desirable to provide assembly 10 with an additional feature to be described below. More specifically, when the sheet being cut is hollow and open ended as is sheet 112 illustrated in FIGS. 11 and 12, not only is dust produced at the front and back ends of the saw blade above and below the sheet, during cutting of the latter, but dust may also be produced at the interior of the sheet. Unless prevented, this internally produced dust may move out the open ends of the sheet and escape into the ambient surroundings.

Accordingly, when assembly 10 is utilized to cut sheet 112 or the like, the assembly may include an arrangement to capture and collect the internally produced dust so as to prevent it from escaping to the ambient surroundings. This arrangement includes any suitable vacuum seal 114, for example masking tape, located at one open end of sheet 112 to seal this open end. The other open end is also provided with a suitable vacuum seal 116. Located at one side edge of seal 116 is an opening (not shown) against which the otherwise free end of a suction conveyance tube 118 is vacuum seal connected. The other end of tube 118 (not shown) is connected to a suitable suction supply (also not shown).

As just stated, suction conveyance tube 118 is connected with seal 116 at one side thereof, i.e., at one corner of sheet 112. As sheet 112 is cut by saw blade 26, the internally produced sawdust is driven by means of suction towards seal 116 and into suction conveyance tube 118. In this regard, it should be noted that the sheet is cut in a direction towards the opening in seal 116 from the opposite side of the sheet, as indicated by arrow 120. It has been found that this is necessary to maximize the suction capacity within board 112, especially where the board includes separate longitudinally extending internal compartments extending the length of the board.

From the foregoing, it should be apparent that cutting assembly 10 including all the various features described above provides a reliable and yet uncomplicated and economical way to prevent dust from escaping into the ambient surroundings during the cutting operation. Similar principles to those described above could be applied when utilizing either a power drill or a power oscillating sander. For example, the dust or shavings produced as a result of drilling into sheet material is generally directed around the drill bit as the latter rotates. To capture and collect this dust, a hollow clamp having a circular cross section or a partially circular cross section could be suitably coaxially supported around the drill bit. The radially inner surface of this clamp could include one or more openings extending therethrough and into the hollow chamber within the hollow clamp. This clamp could, in turn, be connected to a vacuum hose so that the dust accumulated around the bit is drawn into the openings in the clamp by means of suction and thereafter drawn out through the hose.

A vibrating sander, which is generally rectangular in shape and which oscillates back and forth during sanding operation produces dust between the surface being sanded and the sander. This dust generally escapes into the ambient surroundings along the lengthwise side of the sander, although some will escape at opposite ends thereof. To capture and collect this dust, one or more tubes can be suitably mounted to the sander so that they extend along opposite longitudinal sides and, if desirable, along the front and back end thereof. These tubes would include a plurality of openings, for example 3/32 in diameter, facing directly downwardly against the surface being sanded and/or facing inwardly towards the sander at angle from the vertical, for example, 45°. The tubes would be connected to a vacuum hose so that air and the dust particles around the sander are drawn into the openings, through the tubes and into the vacuum hose.

What we claim is:

1. A circular saw including a horizontally extending flat base having a front end and a back end, a circular saw blade, means for supporting said blade partially above and partially below said base in a predetermined vertical plane, means for rotating said blade in a direction which causes the outer edge of said blade to rotate up at the front end of said base and down at the back end of said base, a top blade guard fixedly located relative to and around a top outer edge portion of said blade and having a front end vertically spaced above the front end of said base, and a bottom blade guard located around a bottom outer edge portion of said blade and movable towards and around the back end of said base, the improvement comprising:
   a. a shroud having a substantially U-shaped cross section and being positioned around an outer edge portion of said blade between said front end of said top blade guard and the front end of said base, said shroud having one end substantially vacuum seal connected with said front end of said top blade guard, an opposite end substantially vacuum seal connected with the front end of said base and an opening extending through said shroud; and
   b. a main suction conveyance tube having one open end adapted for connection with suction producing means and the other open end vacuum seal conected with said shroud around said opening through said shroud, said other open end defining a suction tube opening located approximately in the plane of and in front of said saw blade adjacent said base and said blade.

2. The improvement of claim 1 wherein said suction tube opening is approximately located on a line which is tangent to said blade and which passes through the forwardmost intersection of said blade and said base.

3. The improvement of claim 1 wherein said suction tube opening is square in configuration, each side of said square being between approximately 5/8 and 6/8 in length.

4. The improvement according to claim 3 wherein an end segment of said tube including said suction tube opening extends out and up from the opening in said shroud in a curvilinear fashion.

5. The improvement according to claim 1 including a secondary suction conveyance tube having one open end adapted for connection with suction producing means and the other open end vacuum seal connected with said top blade guard around an opening through said top blade guard, said other open end of said secondary tube defining a secondary suction tube opening located approximately in the plane of said saw blade adjacent said top blade guard and forwardly of a vertical plane which is normal to said saw blade plane and which passes through the center of said blade.

6. The improvement of claim 5 wherein said secondary suction tube opening is located in a plane which is normal to said blade plane and which passes through the center of said blade, said last-mentioned plane being at approximately a 30°angle with said vertical plane.

7. The improvement according to claim 6 wherein said secondary suction tube is square in configuration, each side of said square being between approximately ⅝ and 6/8 in length.

8. An assembly for cutting sheet material, comprising:
   a. a circular saw including a horizonally extending flalt base having a front end and a back end and under and against which said sheet material is adapted to pass for cutting said material, a circular saw blade means for supporting said blade partially above and partially below said base in a predetermined vertical plane, means for rotating said blade in a direction which causes the outer edge of said blade to rotate up at the front end of said base and down at the back end of said base, a top blade guard fixedly located around a top outer edge portion of said blade and having a front end vertically spaced above the front end of said base, said top blade guard having an opening extending therethrough, a bottom blade guard located around a bottom outer edge portion of said blade and movable towards and around the back end of said base, a shroud having a substantially U-shaped cross section and being positioned around an outer edge portion of said blade between said front end of said top blade guard and the front end of said base, said shroud having one end substantially vacuum seal connected with said front end of said top blade guard, an opposite end substantially vacuum seal connected with the front end of said base and an opening extending through said shroud, a main suction conveyance tube having one open end adapted for connection with suction producing means and the other open end vacuum seal connected with said shroud around said opening through said shroud, said other open end defining a main suction tube opening located in the plane of and in front of said saw blade on a line which is tangent to the outer edge of said blade and which pases through the forwardmost intersection of said blade and said base, and a secondary suction conveyance tube having one open end adapted for connection with said suction producing means and the other open end vacuum seal connected with said top blade guard around said opening through said top blade guard, said other open end of said secondary tube defining a secondary suction tube opening located in the plane of said saw blade adjacent said top blade guard and approximately 30°forwardly of a vertical plane which is normal to said saw plane and which passes through the center of said blade, each of said main and secondary openings being square, each side of said square being between approximately ⅝ and 6/8 in length;
   b. suction producing means connected with said one end of said main tube and with said one end of said secondary tube, said suction producing means providing sufficient suction to produce between approximately 2.50 and 3.00 in. hg. suction pressure at each of said suction openings, whereby to cause dust which is produced from cutting said sheet material and which is located at the front end of said base to pass into said suction tube openings and through said suction conveyance tubes; and
   c. means for preventing dust produced from cutting said sheet material at the back end of said base from passing into the ambient surroundings.

9. An assembly according to claim 8 wherein said dust preventing means includes a solid sheet of material adapted to support the sheet of material to be cut, said support sheet being sufficiently thick so that said saw blade does not cut completely therethrough when cutting said sheet to be cut.

10. An assembly according to claim 9 wherein said dust preventing means includes a support having a horizontally extending circumferential top edge to support the sheet material to be cut, means for vacuum sealing said sheet material to said top surface, a bottom surface, sidewall means, a flat bottom surface tapering down from one segment of said top edge to said side wall means directly below an opposite end segment of said top edge, said top edge, side wall means and bottom surface and said sheet material together defining a vacuum sealed compartment, and means for drawing out air and any dust within said compartment at a point directly below said opposite end segment.

11. An assembly according to claim 8 wherein said sheet material to be cut is hollow and opened at opposite ends, said assembly including first means for vacuum sealing one open end of said sheet material, second means for vacuum sealing the opposite open end of said material and means for drawing out any air and dust within said sheet material through said second means at a corner of said sheet material.

* * * * *

UNITED STATES PATENT AND TRADEMARK OFFICE
CERTIFICATE OF CORRECTION

PATENT NO.   : 3,882,598
DATED        : May 13, 1975
INVENTOR(S)  : P. L. Earle, et al It is certified that error appears in the above-identified patent and that said Letters Patent are hereby corrected as shown below:

(Page 1)

Column 3, line 18 - "he" should read "the"

Column 3, line 40 - "capture" should read "captured"

Column 5, line 29 - "sufficient" has been misspelled

Column 5, line 44 - "including" should read "includes"

Column 6, line 23 - "preferably" has been misspelled

Column 9, line 5 - "velocity" should read "one"

Column 9, line 13 - "velocty" should read "velocity"

Column 9, line 26 - "charge" should read "change"

Column 9, line 35 - "outer" should read "other"

Column 9, line 41 - "blades" should read "blade"

Column 9, line 67 - "arrows" should read "arrow"

Column 10, line 65 - "unless" has been spelled wrong

Column 12, line 18 - "3/32" should read "3/32 inches"

Column 12, line 22 after 45° there should be a period

Column 12, line 64 - "5/8 & 6/8" should read "5/8 & 6/8 inches"

UNITED STATES PATENT AND TRADEMARK OFFICE
CERTIFICATE OF CORRECTION

PATENT NO. : 3,882,598                              Page 2
DATED : May 13, 1975
INVENTOR(S) : P. L. Earle, et al It is certified that error appears in the above-identified patent and that said Letters Patent are hereby corrected as shown below:

Column 13, line 23 - "5/8 & 6/8" should read "5/8 & 6/8 inches"

Column 13, line 26 - "flat" has been misspelled

Column 14, line 16 - "5/8 & 6/8" should read "5/8 & 6/8 inches"

Column 14, line 37 - "Claim 9" should read "Claim 8"

Signed and Sealed this eighteenth Day of November 1975

[SEAL]

Attest:

RUTH C. MASON
Attesting Officer

C. MARSHALL DANN
Commissioner of Patents and Trademarks

Dedication 3,882,598.—*Paul Lewis Earle,* Denver; *Timothy Howard Seeber,* Evergreen; and *Milton French Trosper, Jr.,* Thornton, Colo. DUST CONTROL CUTTING ASSEMBLY FOR CUTTING SHEET MATERIAL. Patent dated May 13, 1975. Dedication filed July 19, 1982, by the assignee, *Johns-Manville Corp.*

Hereby dedicates all claims for the entire remaining term of said patent to the Public.

[*Official Gazette December 21, 1982.*]